(12) United States Patent
Fritze

(10) Patent No.: US 7,985,016 B2
(45) Date of Patent: Jul. 26, 2011

(54) FIBER OPTIC DISPLAY SYSTEMS AND RELATED METHODS

(76) Inventor: Dorian Christine Webb Fritze, Durham, NC (US)

( * ) Notice: Subject to any disclaimer, the term of this patent is extended or adjusted under 35 U.S.C. 154(b) by 493 days.

(21) Appl. No.: 12/082,754

(22) Filed: Apr. 14, 2008

(65) Prior Publication Data

US 2009/0257243 A1    Oct. 15, 2009

(51) Int. Cl.
*G02F 1/1335* (2006.01)
(52) U.S. Cl. .............. 362/561; 40/547; 362/26; 362/27; 362/556; 362/559; 362/565
(58) Field of Classification Search .............. 362/561, 362/551, 554, 556, 26, 27, 559, 565, 812; 40/547
See application file for complete search history.

(56) References Cited

U.S. PATENT DOCUMENTS

| | | |
|---|---|---|
| 3,555,349 A | 1/1971 | Munz |
| 3,878,329 A | 4/1975 | Brown |
| 3,891,305 A | 6/1975 | Fader |
| 3,970,361 A | 7/1976 | Di Matteo et al. |
| 6,005,608 A | 12/1999 | Chakrabarti |
| 6,040,807 A | 3/2000 | Hamagishi et al. |
| 6,128,132 A | 10/2000 | Wieland et al. |
| 6,157,402 A | 12/2000 | Torgeson |
| 6,290,382 B1 * | 9/2001 | Bourn et al. .................. 362/554 |
| 6,377,229 B1 | 4/2002 | Sullivan |
| 6,948,819 B2 | 9/2005 | Mann |
| 7,540,644 B1 * | 6/2009 | Allen ............................ 362/554 |

OTHER PUBLICATIONS

Carmack, C. & Tyson, J. "How Computer Monitors Work," 2007, <http:www.howstufworks.com/monitor.htm>retrieved Apr. 14, 2008.

* cited by examiner

*Primary Examiner* — Stephen F Husar
(74) *Attorney, Agent, or Firm* — Jenkins, Wilson, Taylor & Hunt, P.A.

(57) ABSTRACT

Fiber optic display systems and related methods are disclosed. According to one embodiment, a fiber optic display system can include a plurality of fiber optics. Output ends of the fiber optics can be spaced from one another and can be arranged in predetermined positions such that at least a portion of the output ends are positioned in a first plane and another portion of the output ends are positioned in a second plane. A light-transmissive material can contain the output ends. The output ends can terminate within the light-transmissive material and can be angled with respect to the light-transmissive material such that light transmitted within the fiber optics emits into the light-transmissive material. A light source can generate a plurality of light beams and selectively control input of the light beams into the input ends for transmission of light in the fiber optics such that an image is formed.

20 Claims, 4 Drawing Sheets

⊖ = CRITICAL ANGLE

FIBER OPTIC DISPLAY SYSTEMS AND RELATED METHODS

TECHNICAL FIELD

The subject matter disclosed herein relates generally to display systems. More particularly, the subject matter disclosed herein relates to fiber optic display systems and related methods.

BACKGROUND

Display systems have blossomed since the first black and white televisions made commercially available in the early twentieth century. Most homes now have multiple televisions, computers with displays, and various other display systems. Display systems have become essential to many people for entertainment, creating work product, and communicating information.

Currently available display systems include cathode ray tube (CRT) displays, liquid crystal displays (LCDs), and plasma displays. These display systems are far superior to previous display systems in terms of visual quality, reliability, and efficiency. Although many advances have been made, there is a need for further advances to the visual quality, reliability, and efficiency of display systems.

One desirable feature of display systems is the capability to provide a three-dimensional (3-D) image. There have been many attempts to develop 3-D image technology for use in home display systems. However, these attempts have thus far not been commercially successful.

Accordingly, in light of the above described needs associated with display, there exists a need for improved display systems and associated methods.

SUMMARY

It is an object of the presently disclosed subject matter to provide novel fiber optic display systems and related method.

An object of the presently disclosed subject matter having been stated hereinabove, and which is achieved in whole or in part by the presently disclosed subject matter, other objects will become evident as the description proceeds when taken in connection with the accompanying drawings described hereinbelow.

BRIEF DESCRIPTION OF THE DRAWINGS

The subject matter described herein will now be explained with reference to the accompanying drawings, of which.

DETAILED DESCRIPTION

The subject matter disclosed herein is directed to fiber optic display systems and methods that can provide visual quality, reliability, efficiency, and 3-D imaging features. In accordance with one embodiment, a fiber optic display system can include a plurality of fiber optics each including a cladding, a core, an input end, and an output end. The output ends of the fiber optics can be spaced from one another. Further, the output ends of the fiber optics can be arranged in predetermined positions such that at least a portion of the output ends are positioned in a first plane and another portion of the output ends are positioned in a second plane.

The fiber optic display system can also include a light-transmissive material containing the output ends and at least a portion of the cladding of the fiber optics. The light-transmissive material can have an index of refraction that substantially matches the cladding of the fiber optics. The output ends of the fiber optics can terminate within the light-transmissive material. Further, the output ends of the fiber optics can be angled with respect to the light-transmissive material such that light transmitted within the fiber optics emits into the light-transmissive material.

The fiber optic display system can include a light source operable to generate a plurality of light beams. The light source can be operable to selectively control input of the light beams into the input ends for transmission of light in the fiber optics such that an image is formed by the light being emitted from the output ends of the fiber optics. The image can be a high resolution 3-D image.

As used herein, the term "fiber optic" refers to a fiber configured to guide light along its length. A fiber optic typically includes a cladding, a core, an input end, and an output end. Light can be input into the core at the input end and guided along the length of the fiber optic for exiting at the output end. Light can be kept in the core by total internal reflection. This causes the fiber to act as a waveguide. A difference in the indexes of refraction between the core and cladding produces internal reflection. To couple fiber optics together for preventing loss of light, a material such as a gel or epoxy having the same index of refraction as the fiber optic can be used to adhere the fiber optics together. The fiber optics can be single or multimode fiber optics.

Figure 1:
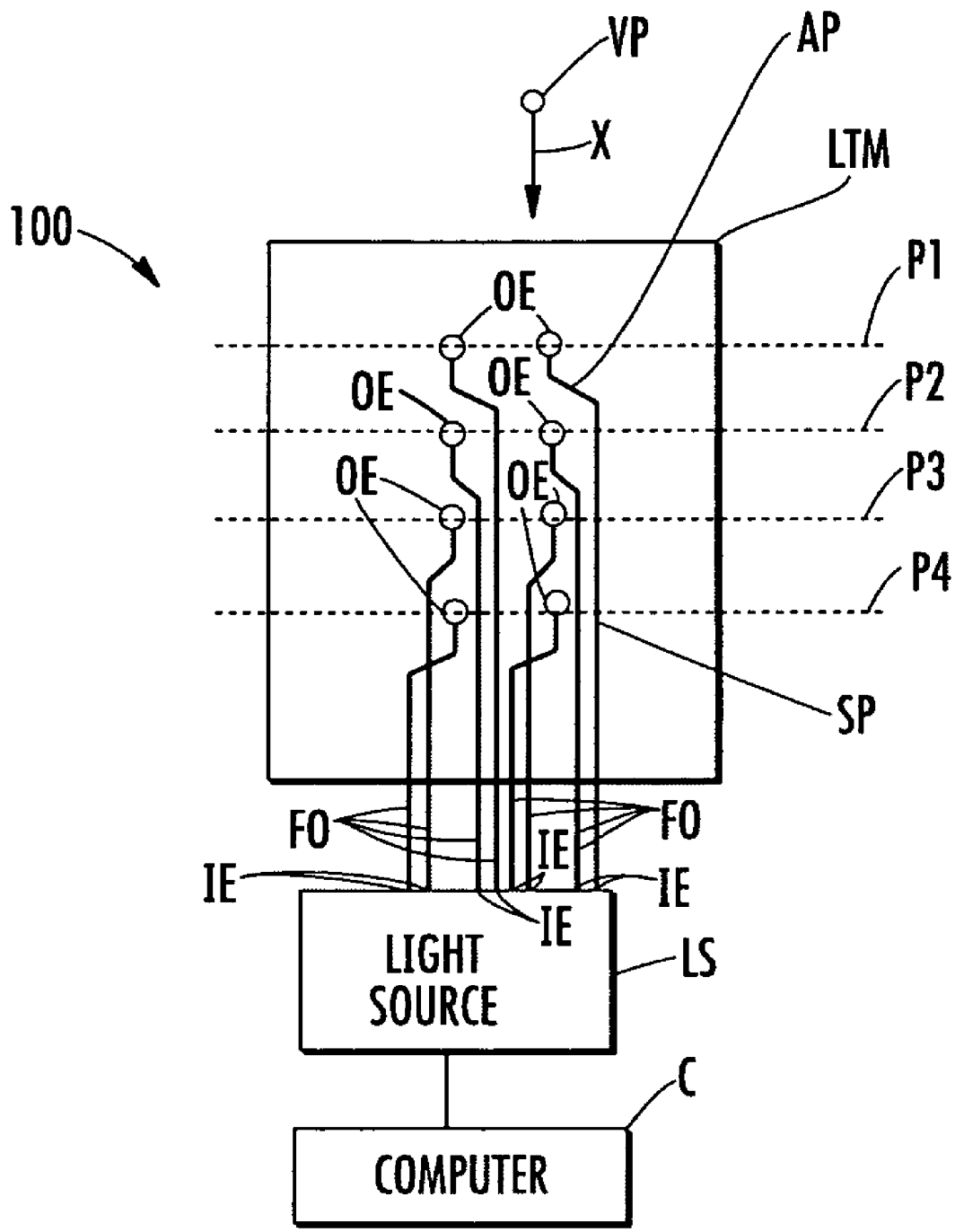
FIG. 1 is a schematic diagram of a fiber optic display system according to an embodiment of the subject matter described herein.

FIG. 1 is a schematic diagram of a fiber optic display system, generally designated 100, according to an embodiment of the subject matter described herein. Referring to FIG. 1, system 100 can include a plurality of fiber optics FO that each includes a cladding, a core, an input end IE, and an output end OE. Output ends OE can be spaced from one another. Further, output ends OE can be arranged in predetermined positions such that different groups of the output ends are positioned in different planes, which are indicated by broken lines P1-P4. Eight fiber optics are shown in FIG. 1 for clarity of illustration, although a system in accordance with the subject matter described herein any number of fiber optics for providing a desired resolution for a viewer. The fiber optics can vary in length.

In one embodiment, optical ends OE can be spaced the length of one pixel from each other. Further, optical ends OE can be spaced from each other in any direction.

System 100 can include a light-transmissive material LTM containing output ends OE. Further, light-transmissive material LTM can contain at least a portion of the cladding of the fiber optics. Light-transmissive material can have an index of refraction that substantially matches the cladding of fiber optics FO. Output ends OE of the fiber optics can terminate within light-transmissive material LTM and can be angled with respect to the light-transmissive material such that light transmitted within the fiber optics emits into the light-transmissive material. Light-transmissive material LTM can be any shape and size for containing the fiber optics.

System 100 can include a light source LS operable to generate a plurality of light beams. Further, system 100 can be operable to selectively control input of the light beams into the input ends for transmission of light in the fiber optics such that an image is formed by the light being emitted from the output ends of the fiber optics. The image can be perceived by a viewer looking in a direction towards fiber optic output ends OE (indicated by direction arrow X) and being generally positioned at a viewer position VP.

System 100 can include a computer C configured to provide instructions to light source LS for generating an image by inputting light into fiber optics FO. Particularly, for example, computer C can read instructions from a computer-readable medium for generating an image using the fiber optic display system described herein. The computer can interpret the instructions and provide commands to control light source LS to input light into fiber optics FO for generating a 2-D or 3-D image or series of images. In one example, the light source can be an LCD light source operable to receive data instructions from the computer on a color and/or brightness level for the light is to be input into each fiber optic.

The control of computer C in accordance with the subject matter described herein may be implemented using a computer program product comprising computer executable instructions embodied in a computer-readable medium. Exemplary computer-readable media suitable for implementing the subject matter described herein include chip memory devices, disk memory devices, programmable logic devices, application specific integrated circuits, and downloadable electrical signals. In addition, a computer-readable medium that implements the subject matter described herein may be located on a single device or computing platform or may be distributed across multiple devices or computing platforms.

Multimode fiber optics can be used for color display. This type of fiber optic can typically have a total diameter of about 40 μm or larger. Although the total diameter of the fiber optic may be large, the core may be small and in the range of less than about 25 μm.

The image can include a plurality of pixels. Fiber optic output ends OE can each correspond to a pixel of an image. Particularly, the light emitted by each output end can correspond to a pixel of the image. Light source LS can control input of light into the fiber optic input ends such that the light output from fiber optic output ends OE form an image. Further, light source LS can control the input of light into the fiber optic input ends such that the light output from fiber optic output ends OE forms a series of different images over time for providing a video display.

The output ends can be of any suitable size and/or shape for achieving a desired pixel resolution for a viewer. In one example, the cross-section of each of the output ends can have an area that is less than 1 mm$^2$. The size of an optical end OE can be about the same size and/or shape as a cross-section of all or another portion of fiber optic FO. In another example, the fiber optics can be substantially the same size. In another example, the cross-sectional diameters of the fiber optics can be substantially the same. In another example, the output ends of the fiber optics can be curved in shape. The fiber optics can be of different lengths depending on the distance between the output end and its connection to the light source.

Fiber optics FO can be positioned in a predetermined arrangement within light-transmissive material LTM to minimize a space occupied by the fiber optics within light-transmissive material LTM. The fiber optics can be embedded within the light-transmissive material. Further, the fiber optics can include different portions that are bent with respect to other fiber optics such that the occupied space is minimized. For example, fiber optics FO include straight and angled portions for arranging the fiber optics within light-transmissive material LTM such that a minimum space is occupied.

The fiber optics can be arranged with different straight and angled portions at different areas within the light-transmissive material such that a minimum space is occupied. In an example of one of fiber optics FO, a fiber optic can include an angled portion AP and a straight portion SP for being closely spaced to an adjacent fiber optic. In the example shown in FIG. 1, the fiber optics extend along different pathways within a single plane. Alternatively, fiber optics can extend along pathways within several different planes such that an occupied space is minimized. The fiber optics can be positioned and can include angled and/or straight portions such that output ends of the fiber optics are at desired pixel positions for forming an image.

The image displayed by system 100 can be a 3-D image. Fiber optic output ends OE can be spaced from one another such that the output ends are at varying depths with respect to viewer position VP. For example, output ends OE are substantially positioned along planes P1 and P2 such that the output ends appear to be at varying depths with respect to a viewer at viewer position VP. Light source LS can be operable to selectively control the input of light beams into the fiber optics such that the image formed by the light is perceived as a 3-D image by a viewer at viewer position VP.

In an example of generating a 3-D image, a 3-D image generated by system 100 can include foreground and background portions. The foreground portions are intended to be perceived by a viewer as being closer to the viewer than background portions. In this example, the foreground portion can be generated by fiber optics having output ends substantially near plane P1 or P2. The background portion can be generated by fiber optics having output ends substantially near plane P3 or P4. A viewer can perceive the image portion generated by light emitted from output ends closer to the viewer as being closer than the image portion generated by light emitted from output ends that are further away. Light source LS can individually control the light input into the fiber optics such that a foreground image are input into fiber optics with output ends near to a viewer. Conversely, light source LS can individually control the light input into the fiber optics such that a background image are input into fiber optics with output ends further from a viewer than the output ends corresponding to a foreground image. As a result, the collection of the foreground and background image portions can be perceived by a viewer at viewer position VP as being a 3-D image.

The fiber optic output ends can be positioned at varying distances with respect to a viewer position such that generated 3-D images have varying perceived depths. By increasing the distance between fiber optic output ends, the perceived depth of an image increases. Further, different portions of the 3-D image can be perceived as being at different depths depending on the relative distance between different fiber optic output ends.

Light source LS can be any suitable light source configured to input light into input ends IE of fiber optics FO. In one example, the light source can be an LCD system capable of interfacing with the fiber optics and selectively inputting light into the fiber optics. In one example, the fiber optics can be attached to the light source in a grid pattern such that each fiber optic receives a specific light beam associated with it. A description of LCDs is provided in the article "How Computer Monitors Work," by C. Carmack and J. Tyson (URL: http://www.howstuffworks.com/monitor.htm) (2007) and the article "How Computer LCDs Work," by J. Tyson (URL: http://www.howstuffworks.com/monitor.htm) (retrieved Apr. 29, 2007), the disclosures of which are incorporated herein by reference in their entireties. Light input into the fiber optics can be individually controlled by the light source LS. Further, the input light can be over any color. In one example, all of the light sources can act or function in the same way. Light can be focused into the individual fiber optics according to the computer output signals.

Figure 2A:
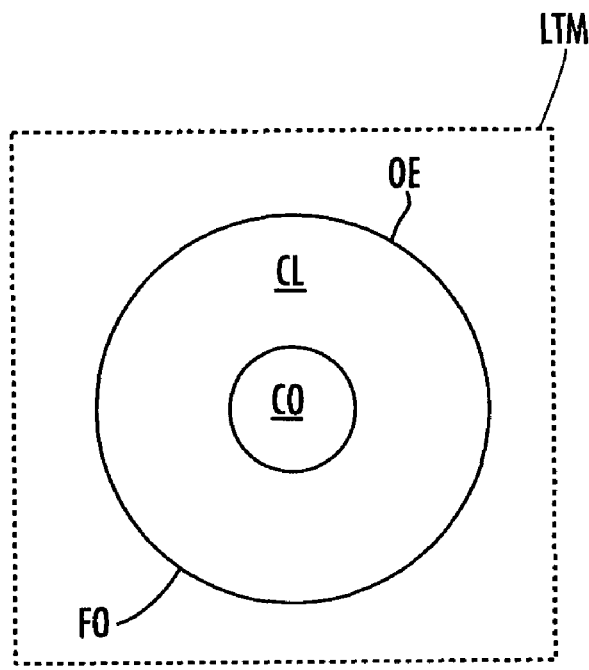
FIGS. 2A and 2B are front and side views, respectively, of a fiber optic enclosed by light-transmissive material in accordance with an embodiment of the subject matter disclosed herein.
Figure 2B:
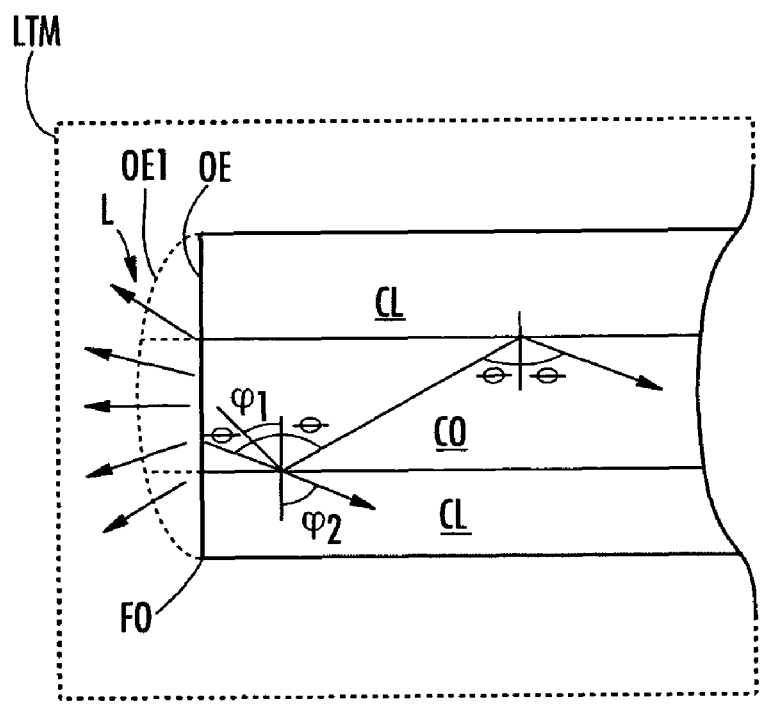

FIGS. 2A and 2B are front and side views, respectively, of fiber optic FO enclosed by light-transmissive material LTM in accordance with an embodiment of the subject matter disclosed herein. Only a portion of light-transmissive material LTM and output end OE of fiber optic FO are shown for the purpose of clarity. Referring to FIGS. 2A and 2B, fiber optic FO includes a core CO and cladding CL. Light can be input into core CO of fiber optic FO at an input end distal from output end OE. The input light can be guided along the length of fiber optic FO within core CO. Upon reaching output end OE, light (indicated by arrows and generally designated L) can emit from core CO at output end OE.

Output end OE of fiber optic FO is flat. As a result, light L passing through core C can intersect at an angle with a surface of light-transmissive material LTM such that light emits into light-transmissive material LTM. The emitted light can pass through light-transmissive material LTM and out of the light-transmissive material in a direction towards a viewer position.

In another example of the output end, fiber optic FO can have a rounded output end OE1 (shown by broken lines). The ends of cladding layer CL and core CO can be shaped to form the rounded end of the fiber optic. The end of core CO can be shaped at an angle with a surface of light-transmissive material LTM such that light emits into light-transmissive material LTM. The emitted light can pass through light-transmissive material LTM and out of the light-transmissive material in a direction towards a viewer position.

Cladding CL is made of a material having a smaller index of refraction (n) than core CO. The index of refraction can be dependent on the wavelength of light propagating through the medium, and is defined as the ratio of the speed of light in a vacuum to the speed of light in the medium. Light travels faster in materials of smaller index of refraction. Light bends according to Snell's law (also known as the law of refraction), which states that the index of refraction of an initial material ($n_1$) multiplied by the sine of the initial angle the light makes with the normal to the interface ($e_1$) is equal to the index of refraction of the final material ($n_2$) multiplied by the sine of the initial angle the light makes with the normal to the interface ($e_2$). Snell's law can be represented by the following equation:

$$n_1 \sin(\theta_1) = n_2 \sin(\theta_2)$$

Thus, as light travels from a material of higher index to one of a lower index, the light is bent away from the normal of the interface. Further, when $e_2$ is 90°, $e_2$ is called the critical angle for it is the angle at which total internal reflection occurs. Total internal reflection occurs when the light traveling through the first medium is unable to escape that medium. The light trapped inside the core now obeys the law of reflection ($e_1 = e_2$).

In this example, fiber optic FO is cylindrical in shape, although the fiber optic may be any other suitable shape. Since the fiber is cylindrical, which is to say that all lines drawn along the length of the fiber optic are parallel, the light beam remains at the critical angle. This means that the light beam can continue traveling inside the fiber optic indefinitely. However, the light traveling in the fiber optic can experience intensity loss proportional to the distance traveled. This loss is referred to as "attenuation". The light signal loses power during propagation due to the fact that some of the light energy can be lost through the cladding even though the light beam is traveling at the critical angle. The light can penetrate the cladding to cause the light to shift in phase or escape the cladding completely. To prevent attenuation, the diameter and/or the index of the cladding can be increased.

Fiber optic FO can be of any suitable size and shape. In one example, a cladding of at least a portion of a fiber optic can be less than 40 microns in diameter. In another example, a core of a fiber optic can have a thickness between about 8 and 25 µm. In another example, a core of at least a portion of a fiber optic can have a thickness less than about 25 µm. Single mode fibers (one wavelength) can have a core of about 8 µm, multimode (multible) fibers have a core of about 25 µm. The cladding can have a thickness of 5 times the wavelength, $5\lambda$, in order to have total internal reflection take place.

Fiber optics can be made, for example, by using either of two types of doped glass for fiber optics, vapor-phased doped fiber optics and rare earth (RE) doped fiber optics. A description of producing fiber optics is described herein, although more details are provided in the article "SC208: Specialty Optical Fiber Design and Applications," by D. DiGiovanni (OFCNFOEC 2007), the disclosure of which is incorporated herein by reference in its entirety. Each fiber optic can begin as a glass tube or rod that is doped by various elements by the use of techniques described hereinbelow to form a thick clear glass rod of a desired composition. The rod can be drawn in order to form thin fiber optics.

The process of drawing the fiber optic can begin by heating the rod in a furnace to about 2100° C. to melt the rod. The melted rod can exit the furnace through a tube and drop into a protective polymer coating applicator. Next, the rod can be passed through curing lamps where the polymer sets and around a capstan to a spooler for spooling.

Typically, the first glass to exit the furnace is drop shaped and is unusable. The first glass is removed and the fiber optic that follows can be fed through the above described process. The diameter of the resulting fiber optic is determined by the rate at which the fiber optic is drawn, and obeys the law of mass conservation. The fiber optic can be drawn at speeds greater than 25 m/s. One perform rod can create more than 1000 km of fiber optic.

Vapor-phased doped fiber optics production includes the reaction of dopants with $SiCl_4$ at 2000° C. to form a "soot" deposit. The soot can then be heated to 2300° C. at which temperature the soot transforms into clear glass. Exemplary techniques for depositing soot include modified chemical vapor deposition (MCVD), vapor phase axial deposition (VPAD), and outside vapor deposition (OVD).

In MCVD, $SiCl_4$ can react inside a preformed silica tube to produce $SiO_2$ deposits. A tube can be rotated as a torch travels along the length of the rod to heat the deposit to 2000° C. when the soot turns into clear glass. The process continues for creating multiple layers of glass. The layers can be altered by the use of different gaseous dopants. Next, the glass can be heated to greater than 2300° C. At this temperature, the surface tension of the inner wall can cause it to collapse. The deposited region then becomes the core of the performed tube.

In another example of creating vapor phase fiber optics, the soot can be deposited by vapor phase axial deposition or outside vapor deposition. In outside vapor deposition, the soot or boule can be brown radially on the outside of a preformed core. In both vapor phase axial deposition and outside vapor deposition, the boule can be heated to over 2000° C. to create clear glass.

Rare earth elements cannot be vaporized at low temperatures. Therefore, a different technique of integration must be used to dope the glass. In one technique for doping the glass, the rare earth material is heated to 800° C. in an internal chamber of a preformed rod, allowing the heated rare earth material to mix with vapor phase elements and used in a MCVD.

Another technique of doping with rare earth elements is to use solution doping. In this technique, a layer of soot can be deposited using the MCVD at a temperature of about 1600° C. This deposition can create a porous layer of soot that can then be soaked in liquid containing rare earth elements. The tube can then be allowed to dry and further processed.

Figure 3:
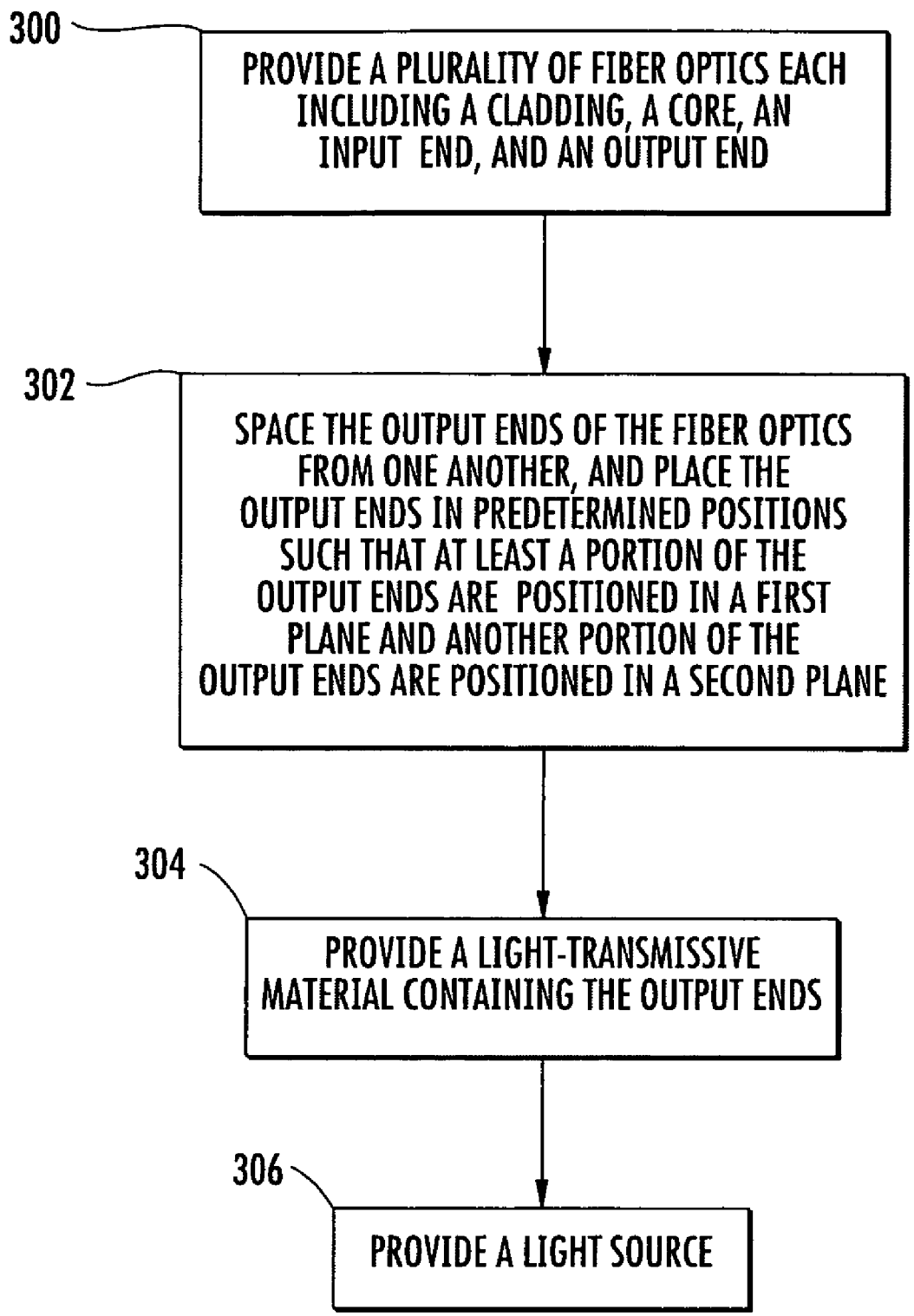
FIG. 3 is a flow chart of an exemplary process for producing a fiber optic display system in accordance with the subject matter described herein.

A fiber optic display system can be produced by any suitable technique. FIG. 3 is a flow chart illustrating an exemplary process for producing a fiber optic display system in accordance with the subject matter described herein. This exemplary process can be utilized for producing system 100 shown in FIG. 1. Referring to FIGS. 1 and 3, a plurality of fiber optics that each includes a cladding, a core, an input end, and an output end can be provided (block 300). For example, fiber optics 100 can be provided.

In block 302, the output ends of the fiber optics can be spaced from one another, and the output ends can be placed in predetermined positions such that at least a portion of the output ends are positioned in a first plane and another portion of the output ends are positioned in a second plane. For example, output ends OE of fiber optics FO can be positioned as shown in FIG. 1. Further, for example, output ends OE can be placed in predetermined positions such that at least a portion of the output ends are positioned in different planes P1-P4.

In block 304, a light-transmissive material containing the output ends and at least a portion of the cladding of the fiber optics is provided. For example, output ends OE and at least a portion of the cladding of fiber optics FO shown in FIG. 1 can be provided. The light-transmissive material can have an index of refraction that substantially matches the cladding of the fiber optics. The output ends of the fiber optics can terminate within the light-transmissive material and can be angled with respect to the light-transmissive material such that light transmitted within the fiber optics emits into the light-transmissive material.

In one embodiment, different groups of fiber optics and different portions of the light-transmissive material can be provided. The different light-transmissive material portions can contain the different fiber optic groups. For example, the fiber optics can be in first and second groups, and first and second portions of the light-transmissive material can contain the first and second fiber optic groups, respectively. The first and second portions of the light-transmissive material can be arranged with respect to one another for forming at least a portion of an image when light is input into the fiber optics. In one example, the light-transmissive material can be substantially cubical in shape.

Figure 4:
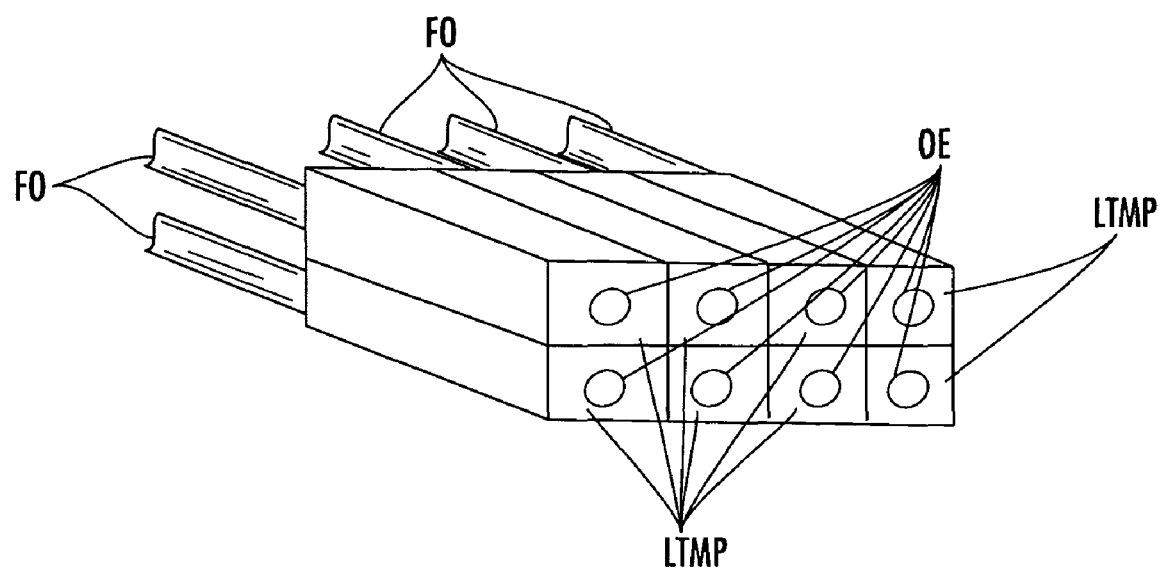
FIG. 4 is a perspective view of a plurality of light-transmissive material portions containing a plurality of fiber optics in accordance with an embodiment of the subject matter described herein.

FIG. 4 is a perspective view of a plurality of light-transmissive material portions LTMP containing a plurality of fiber optics FO in accordance with an embodiment of the subject matter described herein. Referring to FIG. 4, each light-transmissive material portion LTMP includes a single fiber optic, although each portion can alternatively include two or more fiber optics. The inner cores of the fiber optics can be small enough and spaced far enough from each other such that the fiber optics appear substantially invisible to the naked human eye. Further, the fiber optics in the interior and the exterior of the light-transmissive material can be positioned at different depths with respect to a viewer such that a perception of depth is provided to a viewer positioned at the viewer position.

Referring again to FIGS. 1 and 3, in block 306, a light source can be provided. For example, light source LS shown in FIG. 1 can be provided. The light source and/or a computer (such as computer C) connected to light source can be operable to selectively control input of light beams into the input ends of the fiber optics for transmission of light in the fiber optics such that an image is formed by the light being emitted from the output ends of the fiber optics.

The number of fiber optics that can fit in each pixel can limit the size of the display. The cladding can have a thickness greater than 5 wavelengths, which is 3.5 µm for red light for example. Thus, a multimode fiber optic can be approximately 40 µm in diameter. If a large pixel size of 1 mm is used, 155 fiber optics can fit in a single pixel. Since in one embodiment, a 3-D display can utilize several pixels in the same line for the 3-D image. As a result, the display may be limited to one dimension being 155 pixels. The remaining two dimensions can be any desired size.

One exemplary advantage of using fiber optics in creating a 3-D display is that a desired color or shade of light can be directly guided through the fiber optic. This is significantly different than LCD display systems, which have a light source common to all pixels, and the color to be displayed is generated within each pixel. As described herein, a light source (such as an LCD) can be used to generate the light from a remote location, and guide the light by the use of fiber optics to a desired pixel location for generating a 3-D image.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A fiber optic display system comprising:
    a plurality of fiber optics each comprising a core having a first index of refraction, a cladding having a second index of refraction that is less than the first index of refraction, an input end, and an output end, the output ends of the fiber optics being spaced from one another and being arranged in predetermined positions such that at least a portion of the output ends are positioned in a first plane and another portion of the output ends are positioned in a second plane;
    a light-transmissive material within which are contained the output ends and at least a portion of the cladding of the fiber optics, the light-transmissive material having a third index of refraction that substantially matches the second index of refraction, the output ends of the fiber optics terminating within the light-transmissive material and being angled with respect to the light-transmissive material such that light transmitted within the fiber optics emits into the light-transmissive material; and
    a light source operable to generate a plurality of light beams and operable to selectively control input of the light beams into the input ends for transmission of light in the fiber optics such that an image is formed by the light being emitted from the output ends of the fiber optics.

2. The fiber optic display system of claim 1 wherein the output ends of the fiber optics are spaced from one another such that the output ends are at varying depths with respect to a viewer position.

3. The fiber optic display system of claim 2 wherein the light source is operable to selectively control the input of the light beams such that the image formed by the light is perceived as a three-dimensional image by a viewer at the viewer position.

4. The fiber optic display system of claim 1 wherein the fiber optics are substantially the same size.

5. The fiber optic display system of claim 1 wherein cross-sectional diameters of the fibers optics are substantially the same.

6. The fiber optic display system of claim 1 wherein the output ends of the fiber optics are curved in shape.

7. The fiber optic display system of claim 1 wherein the image includes a plurality of pixels, and wherein the light emitted by each output end corresponds to one of the pixels.

8. The fiber optic display system of claim 1 wherein a cross-section of each of the output ends has an area that is less than 1 mm2.

9. The fiber optic display system of claim 1 wherein at least some of the fiber optics include an angled portion such that output ends of the at least some of the fiber optics are positioned to form the image.

10. The fiber optic display system of claim 1 wherein at least some of the fiber optics include a straight portion such that output ends of the at least some of the fiber optics are positioned to form the image.

11. The fiber optic display system of claim 1 wherein the fiber optics are positioned in a predetermined arrangement to minimize a space occupied by the fiber optics within the light-transmissive material.

12. The fiber optic display system of claim 1 wherein the fiber optics include a first and second group of fiber optics, wherein the light-transmissive material includes first and second portions, the second portion of the light-transmissive material at least partially surrounding the first portion of the light-transmissive material, wherein the first and second groups of fiber optics are positioned within the first and second portions of the light-transmissive material, respectively, and wherein the light source is operable to input light beams into the first group of fiber optics that provide a perception of depth to the image for a viewer positioned at a viewer position.

13. The fiber optic display system of claim 1 wherein the cladding of at least a portion of the fiber optics is less than 40 microns in diameter.

14. The fiber optic display system of claim 1 wherein the core of at least a portion of the fiber optics has a thickness of between about 8 and 25 μm.

15. The fiber optic display system of claim 1 wherein the core of at least a portion of the fiber optics has a thickness less than about 25 μm.

16. The fiber optic display system of claim 1 wherein the light source is a liquid crystal display (LCD) system.

17. A method of producing a fiber optic display system, the method comprising:
provided a plurality of fiber optics each comprising a core having a first index of refraction, a cladding having a second index of refraction that is less than the first index of refraction, an input end, and an output end;
spacing the output ends of the fiber optics from one another and placing the output ends in predetermined positions such that at least a portion of the output ends are positioned in a first plane and another portion of the output ends are positioned in a second plane;
providing a light-transmissive material within which are contained the output ends and at least a portion of the cladding of the fiber optics, the light-transmissive material having a third index of refraction that substantially matches the second index of refraction, the output ends of the fiber optics terminating within the light-transmissive material and being angled with respect to the light-transmissive material such that light transmitted within the fiber optics emits into the light-transmissive material; and
providing a light source operable to generate a plurality of light beams and operable to selectively control input of the light beams into the input ends for transmission of light in the fiber optics such that an image is formed by the light being emitted from the output ends of the fiber optics.

18. The method of claim 17 wherein providing a plurality of fiber optics includes providing first and second groups of fiber optics, wherein providing a light-transmissive material includes provides first and second portions of light-transmissive material, the first and second portion of light-transmissive material containing the first and second groups of fiber optics, respectively, and
the method comprising positioning the first and second portions adjacent one another such that the first and second groups of fiber optics are arranged with respect to one another for forming at least a portion of the image.

19. The method of claim 18 wherein the first and second portions of light-transmissive material are substantially cubical in shape.

20. The method of claim 17 wherein cross-sectional diameters of the fibers optics are substantially the same.

* * * * *